A. ENGLAND.
COMPOUND AIR COMPRESSOR.
APPLICATION FILED SEPT. 22, 1906.
1,034,602.
Patented Aug. 6, 1912.
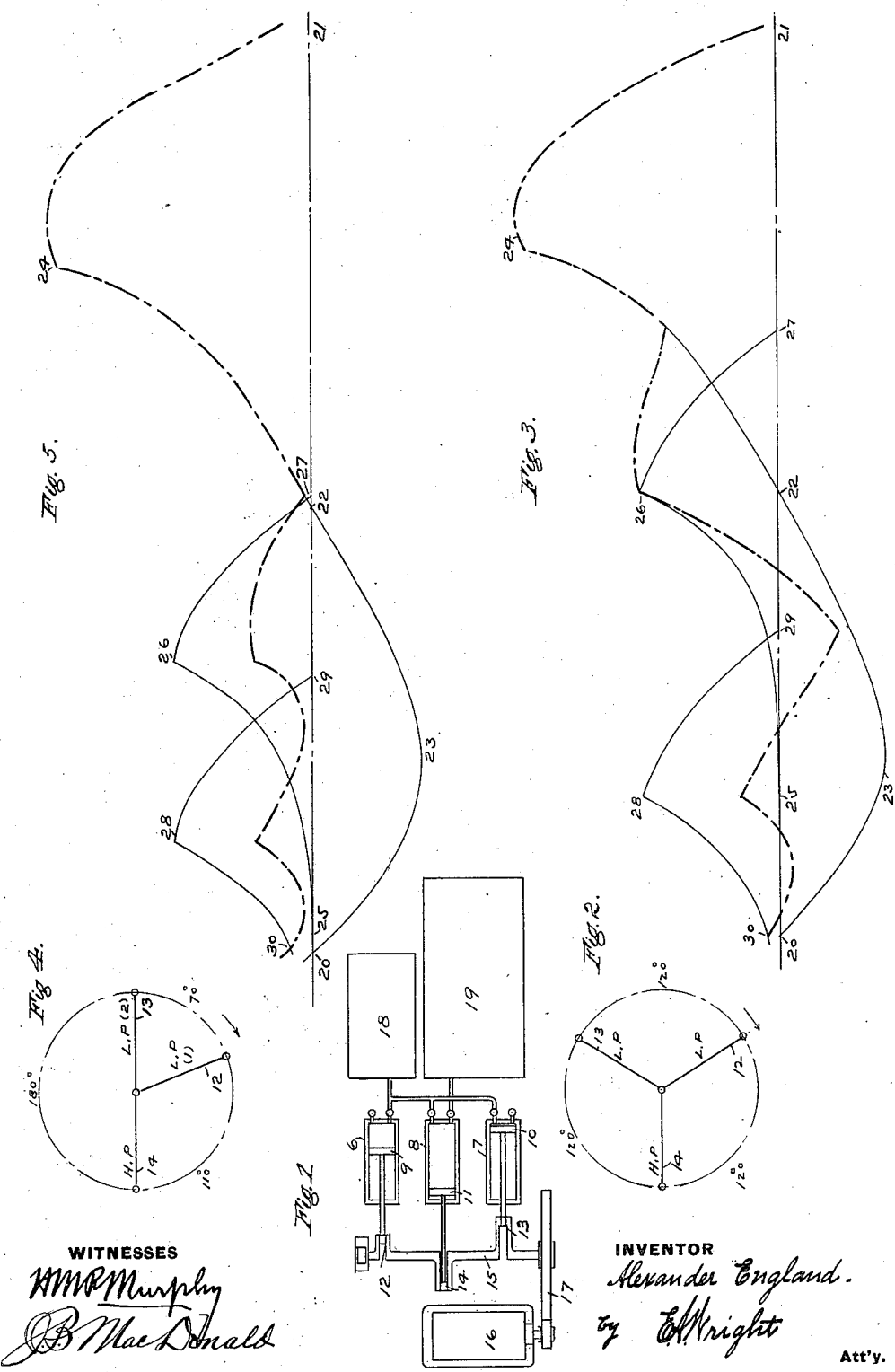

UNITED STATES PATENT OFFICE.

ALEXANDER ENGLAND, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

COMPOUND AIR-COMPRESSOR.

1,034,602.  Specification of Letters Patent.  Patented Aug. 6, 1912.

Application filed September 22, 1906. Serial No. 335,721.

*To all whom it may concern:*

Be it known that I, ALEXANDER ENGLAND, a citizen of the United States, residing at Wilkinsburg, in the county of Allegheny and State of Pennsylvania, have invented new and useful Improvements in Compound Air-Compressors, of which the following is a specification.

This invention relates to compound or multiple-stage air compressors, and more particularly to that class of compressors having three or more single acting cylinders and pistons driven from a common crank shaft.

In an ordinary two-stage compressor of this type having two low-pressure cylinders and one high-pressure cylinder, the cranks are usually arranged at equal spaces of 120° apart, and an intermediate expansion chamber is provided for receiving the discharge from the two low-pressure cylinders, and is connected with the suction or inlet of the high-pressure cylinder. With this construction, there is a positive effort required at the crank shaft to move the low-pressure pistons in both directions, and to move the high-pressure piston through its forward stroke, but during its back stroke the high pressure piston exerts a negative resistance upon the crank shaft to the extent of the pressure existing in the intermediate chamber which acts upon the said high pressure piston and tends to turn the crank shaft in the same direction that it is being driven by the motor.

When pumping at the customary pressures for which these compressors are usually employed, it often happens that the negative resistance produced upon the crank shaft by the pressure upon the high-pressure piston during certain portions of its back stroke, equals or exceeds the positive effort or resistance exerted by the low pressure pistons, consequently, during such periods, the resultant forces of the pump exert no net resistance to the positive rotative effort of the motor upon the shaft, the effect being a cessation or reversal of the stress in the transmission gear which usually occurs twice in each complete revolution of the shaft. This causes an uneven or racking action in the moving of the parts, which is very detrimental to the efficiency and wear of the pump, and the object of my invention is to overcome this difficulty by an improved form of connection which will result in a substantially continuous positive effort upon the crank shaft.

In the accompanying drawing; Figure 1 is a diagrammatic plan view of a two-stage three-cylinder motor driven compressor; Fig. 2 a diagram indicating the customary arrangement of equal angles or spacing of the cranks of these compressors; Fig. 3 a diagram of curves, indicating the positive and negative resistances on the crank shaft produced by each of the pistons throughout a complete revolution of the shaft, with the crank angles arranged as indicated in Fig. 2, the heavy broken line also indicating the resultant effort or resistance of all three pistons; Fig. 4 a diagram indicating a preferred arrangement of the crank angles embodying my improvement; and Fig. 5 a diagram of curves showing the efforts and the net resultant effect at the crank shaft with the improved spacing of crank angles shown in Fig. 4.

According to the design illustrated, the compressor is composed of two outside low-pressure cylinders, 6 and 7, and an intermediate high-pressure cylinder 8, having their respective single acting pistons 9, 10 and 11 connected to cranks 12, 13 and 14, operated by the crank-shaft 15. This crank-shaft may be driven by any suitable means, such as electric motor 16, and through any ordinary or preferred form of transmission gear, 17.

The low pressure cylinders are provided with the usual suction valves and discharge valves, the latter preferably delivering fluid into an intermediate compression and cooling chamber 18, from which it is drawn into the high-pressure cylinder 8, and subjected to its second or final stage of compression as it is delivered into the reservoir 19.

When operating as an air-compressor, it will be apparent that the outward movement of the low-pressure pistons, during which atmospheric air is being drawn into these cylinders, will exert very little effort or resistance at the crank-shaft other than that due to the friction of the moving parts, as these pistons are then substantially balanced as to air-pressure.

The resistance to be overcome, or effort required at the crank-shaft, to move each of the pistons inward, will be determined by the degree of air pressure acting on the face of the piston and the angle of the crank with respect to the cylinder at any given point in the revolution. During the outward stroke of the high-pressure piston the pressure of the intermediate chamber 19 acting on the face of said piston exerts a negative resistance or torque at the shaft tending to turn the same in the same direction that it is being driven by the motor, which negative effort may also be determined by the air pressure acting on said piston and the angle of the crank at any given point in its revolution. In this manner, the effort or torque at the crank-shaft due to each compressor piston may be calculated for any number of points throughout a complete revolution of the shaft and by connecting the proper points curves may be plotted graphically representing the respective forces. This is clearly shown in Figs. 3 and 5. According to Fig. 3, the calculations are made upon the supposition that the three cranks are equally spaced at 120° apart, in the usual manner, as indicated in Fig. 2. The horizontal line 20—21 indicates a complete revolution of the crank-shaft, beginning with the outward stroke of the high-pressure piston, the curve for which is indicated by the line 20, 23, 22, 24, 21. This curve extends below the horizontal line for the first half of the revolution and then rises above the horizontal as compression begins upon the inward stroke of the piston, increasing to the point 24 at which the crank is substantially at right angles to the connecting rod, and then descending, as the angle diminishes, to the point 21 at the end of the inward stroke. In the same way, the curve 30, 28, 29, indicates the positive effort at the crank-shaft due to one low-pressure piston, and the curve 25, 26, 27, the effort due to the other low-pressure piston. The distance of the points of the curve above the horizontal line indicates the positive effort at the crank-shaft for each respective piston, while the distance below the horizontal line to the curve 20, 23, 22, represents the negative effort, due to the high-pressure piston, and the heavy broken line indicates the resultant effort or combined effect due to all the cranks acting on the crank-shaft. As this resultant curve cuts the horizontal line at four different points, it will be apparent that there will be a reversal of the stress transmitted through the driving gear at each revolution, which variation in stress causes an undesirable racking of the transmission gear involving unsteady action and great wear of the parts. According to my improvement this objection is overcome by so arranging the angles of the low-pressure cranks with respect to the high-pressure crank, that the positive effort or resistance due to the said cranks shall balance or overcome the negative resistance produced by the high-pressure piston during its outward stroke. One such arrangement of cranks is indicated in Fig. 4, and the corresponding effort curves are graphically illustrated in Fig. 5. According to this design the low-pressure crank 12 is spaced only 110° from the high-pressure crank 14 and the low-pressure crank 13 is spaced only 70° from the other low-pressure crank, thereby bringing the effort curves 30, 28, 29 and 25, 26, 27 of the two low-pressure pistons farther to the left and nearer together than in the usual design illustrated in Figs. 2 and 3, whereby the negative resistance of the high-pressure piston indicated by the curve 20, 23, 22, is more than offset by the combined positive efforts due to the low-pressure cranks. The resultant curve, indicated by the heavy broken line, is therefore entirely above the horizontal line, as shown in Fig. 5, and at no time during the revolution of the shaft is there a resultant negative resistance to cause a reversal of the stress in the transmission gear. The resistance or effort at the crank-shaft is therefore of a constant character, that is, exerted continually in the same direction, so that a continuous positive stress is produced in the transmission gear, which results in a smooth and steady action of the driving mechanism.

While I have diagrammatically illustrated one form of my improvement, it will be understood that the invention is not limited to any particular design, but applies broadly to any and all forms of compressors of this type in which the crank angles may be varied from the usual symmetrical arrangement so as to avoid great variations or reversals of stress in the driving gear.

Having now described my invention, what I claim as new and desire to secure by Letters Patent, is:—

1. In a compressor, the combination with a plurality of cylinders and pistons and a crank shaft for driving said pistons, of driving connections so spaced as to produce a continuous positive resistance on the crank shaft.

2. In a compressor having a plurality of cylinders and pistons with means for driving the same, driving connections so spaced as to produce a continuous net resistance of the pistons against said driving means.

3. In a compound compressor having high and low-pressure cylinders and pistons, a shaft for driving said pistons and connections between the pistons and shaft so spaced as to produce a continuous net resistance on said shaft throughout a complete revolution.

4. In a compound compressor, the combination with high and low-pressure cylinders having pistons, and a crank-shaft for driving the same, of crank connections for said pistons so spaced as to produce a continuous net resistance on the crank-shaft.

5. In a compound compressor, the combination with high and low-pressure cylinders having pistons, and a crank-shaft for driving the same, of a crank connection for each piston, the cranks being so spaced as to their relative angles as to produce a continuous positive resistance on the crank-shaft.

6. In a compound compressor, the combination with two low-pressure cylinders and one high-pressure cylinder, and pistons in said cylinders, of driving means for said pistons, and connections adapted to produce a continuous positive resistance on said driving means.

7. In a compound compressor, the combination with two low-pressure cylinders and one high-pressure cylinder, and pistons in said cyinders, of a crank-shaft for driving said pistons, and driving connections so spaced as to counterbalance the negative resistance produced by the high-pressure piston with the positive resistance of the low-pressure pistons.

8. In a compound compressor, the combination with two low-pressure cylinders and one high-pressure cylinder, and pistons in said cylinders, of a crank-shaft for driving said pistons, the cranks being so spaced as to their relative angles as to give a continuous net resistance on the shaft.

9. In a compound compressor, the combination with two low-pressure cylinders and one high-pressure cylinder, and pistons in said cylinders, of a crank-shaft and cranks for driving said pistons, the low-pressure crank angles being arranged so that the negative effort on the shaft due to the high-pressure piston on its outward stroke is balanced by the net resistance due to said low-pressure pistons.

10. In a compressor, the combination with two low-pressure cylinders and pistons and one high-pressure cylinder and piston, of a crank-shaft, a crank connection for each piston, the relative angles of the cranks being adapted to produce a continuous net resistance on the shaft, and means for driving said crank-shaft.

11. In a compound compressor having high and low pressure cylinders and pistons, a shaft for driving said pistons, and driving connections so spaced as to counter-balance the negative resistance produced by the high pressure piston with the positive resistance of the low pressure pistons.

In testimony whereof I have hereunto set my hand.

ALEXANDER ENGLAND.

Witnesses:
R. F. EMERY,
J. B. MACDONALD.